(12) United States Patent
Venkataraman et al.

(10) Patent No.: US 10,848,996 B2
(45) Date of Patent: Nov. 24, 2020

(54) ADAPTIVE PROCEDURES FOR MEASUREMENT OF WIRELESS CHANNEL CONDITIONS

(71) Applicant: Apple Inc., Cupertino, CA (US)

(72) Inventors: Vijay Venkataraman, Sunnyvale, CA (US); Chiranjeevi M. Kosuri, Morgan Hill, CA (US); Srinivasan Nimmala, San Jose, CA (US); Muthukumaran Dhanapal, Dublin, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 16/163,455

(22) Filed: Oct. 17, 2018

(65) Prior Publication Data
US 2020/0128415 A1   Apr. 23, 2020

(51) Int. Cl.
| | |
|---|---|
| *H04W 72/10* | (2009.01) |
| *H04W 24/08* | (2009.01) |
| *H04L 12/26* | (2006.01) |
| *H04W 76/27* | (2018.01) |

(52) U.S. Cl.
CPC ............ *H04W 24/08* (2013.01); *H04L 43/16* (2013.01); *H04W 72/10* (2013.01); *H04W 76/27* (2018.02)

(58) Field of Classification Search
CPC combination set(s) only.
See application file for complete search history.

(56) References Cited

U.S. PATENT DOCUMENTS

| | | | |
|---|---|---|---|
| 8,565,753 B2 | 10/2013 | Hamabe | |
| 2016/0183193 A1* | 6/2016 | Laffaye | H04W 52/0254 370/311 |
| 2016/0286454 A1* | 9/2016 | Mager | H04W 36/00837 |
| 2016/0316405 A1 | 10/2016 | Balan | |
| 2017/0188281 A1* | 6/2017 | Li | H04W 36/18 |
| 2017/0230780 A1* | 8/2017 | Chincholi | H04B 17/336 |
| 2018/0269950 A1* | 9/2018 | John Wilson | H04B 17/21 |

FOREIGN PATENT DOCUMENTS

EP   3 151 029 A1   4/2017

* cited by examiner

*Primary Examiner* — Fahmida S Chowdhury
(74) *Attorney, Agent, or Firm* — Kowert, Hood, Munyon, Rankin & Goetzel, P.C.

(57) ABSTRACT

A device wirelessly communicating over a wireless network may adjust a threshold from a network-configured value to a new value in response to a performance characteristic of an application executing on the device not meeting a specified metric, for example in response to the application experiencing a latency greater than a specified latency value. The threshold may be associated with a measurement event configured by the wireless network, and the device may use the new value for the threshold when performing measurements on wireless channel conditions of the wireless network. When adjusting the threshold, the device may adjust the threshold once per application session of the application, and/or once per current radio resource control (RRC) connection before the wireless network releases the current RRC connection. Furthermore, the device may adjust the threshold only if the network-configured value associated with the measurement event is greater than a specified threshold value.

20 Claims, 8 Drawing Sheets

LTE Measurement Report Triggering

- A1 Serving becomes better than threshold
- A2 Serving becomes worse than threshold
- A3 Neighbour becomes offset better than PCell
- A4 Neighbour becomes better than threshold
- A5 PCell becomes worse than threshold1 and neighbour becomes better than threshold2
- A6 Neighbour becomes offset better than SCell
- C1 CSI-RS resource becomes better than threshold
- C2 CSI-RS resource becomes offset better than reference CSI-RS resource
- B1 Inter RAT neighbour becomes better than threshold
- B2 PCell becomes worse than threshold1 and inter RAT neighbour becomes better than threshold2
- W1 WLAN becomes better than a threshold
- W2 All WLAN inside WLAN mobility set becomes worse than threshold1 and a WLAN outside WLAN mobility set becomes better than threshold2
- W3 All WLAN inside WLAN mobility set becomes worse than a threshold
- V1 The channel busy ratio is above a threshold
- V2 The channel busy ratio is below a threshold FIG. 9
(Prior Art)

ADAPTIVE PROCEDURES FOR MEASUREMENT OF WIRELESS CHANNEL CONDITIONS

FIELD OF THE INVENTION

The present application relates to wireless communications, and more particularly to adaptive procedures, e.g. procedures taking into consideration applications executing on a device and/or when wireless security is enabled on the device, for the measurement of wireless channel conditions.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. The ever increasing number of features and functionality introduced in wireless communication devices creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, NR, Wi-Fi, BLUETOOTH™, etc.).

In cellular networks, a mobile device communicating on a given cell typically performs measurements on the signal strength/quality, including the signal strength/quality of neighbor cells, as the mobile device may move from cell to cell and may need to perform cell selection/reselection and/or handover to a different cell. For example, in an LTE network, a UE can measure parameters based on a reference signal, e.g. parameters such as RSRP (Reference Signal Received Power) which provides a measurement of the average received power over the resource elements that carry cell-specific reference signals within a certain frequency bandwidth, and RSRQ (Reference Signal Received Quality) which indicates the quality of the received reference signal. The UE is thus set up to perform various measurements to improve its overall operation. The measurement results may result in various trigger events, for example a handover or redirection/reselection of the UE to a different cell. Most cellular communication standards have well defined measurement report triggering for events that occur based on the measurement results. However, there are cases when previously defined measurement report triggering can result in decreased performance, for example when a UE is executing/running certain applications and/or making measurements before security on a device is enabled. There is therefore room for improvement in the procedures for measurement of wireless channel conditions for wireless communication devices.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, for performing adaptive procedures for measurement of wireless channel conditions, e.g. taking into account applications and/or wireless security. Embodiments are further presented herein for wireless communication systems containing wireless communication devices (UEs) and/or base stations and access points (APs) communicating with each other within the wireless communication systems.

Pursuant to the above, a device wirelessly communicating over a wireless network may adjust a threshold associated with a measurement event (which was configured by the wireless network) from a network-configured value to a new value (different from the network-configured value) in response to a performance characteristic of an application executing on the device not meeting a specified metric. The performance characteristic of the application not meeting the specified metric may include the application experiencing a latency greater than a specified latency value, or the application not responding to user input within a specified amount of time, or the application not performing according to certain specified criteria, and/or any other performance issues given consideration as desired. The device may then use the new value for the threshold when performing measurements on wireless channel conditions of the wireless network. The device may locally store the network-configured value if the threshold is adjusted to the new value, and may adjust the threshold once per application session of the application, and/or once per current radio resource control (RRC) connection before the wireless network releases the current RRC connection.

Furthermore, the device may adjust the threshold only if the network-configured value is greater than a specified threshold value. The threshold may be adjusted when the measurement event is configured by the network before a present session of the application was started, and it may also be adjusted when the measurement event is configured by the network while the present session of the application is ongoing. The device may begin using the network-configured value for the threshold upon conclusion of a present session of the application. In some embodiments, if one or more measurement events for the device have been configured before security for the device has been established, the device may perform any one or more of the following:

- prioritize serving cell measurements (of the measurements on the wireless channel conditions of the wireless network) over neighbor cell measurements (of the measurements on the wireless channel conditions of the wireless network);
- prioritize intra-frequency neighbor measurements of the neighbor cell measurements over inter-frequency measurements of the neighbor cell measurements;
- perform a single serving-cell measurement of over multiple connected mode discontinuous reception on-durations; or
- perform a single neighbor-cell measurement over multiple connected mode discontinuous reception on-durations.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
AS: Access Stratum
BS: Base Station
BSR: Buffer Size Report
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NAS: Non-Access Stratum
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAN: Radio Access Network
RAT: Radio Access Technology RF: Radio Frequency
ROHC: Robust Header Compression
RRC: Radio Resource Control
RTP: Real-time Transport Protocol
RTT: Round Trip Time
RX: Reception/Receive
SAS: Spectrum Allocation Server
SI: System Information
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX: Transmission/Transmit
UE: User Equipment
UI: User Interface
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBOX™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
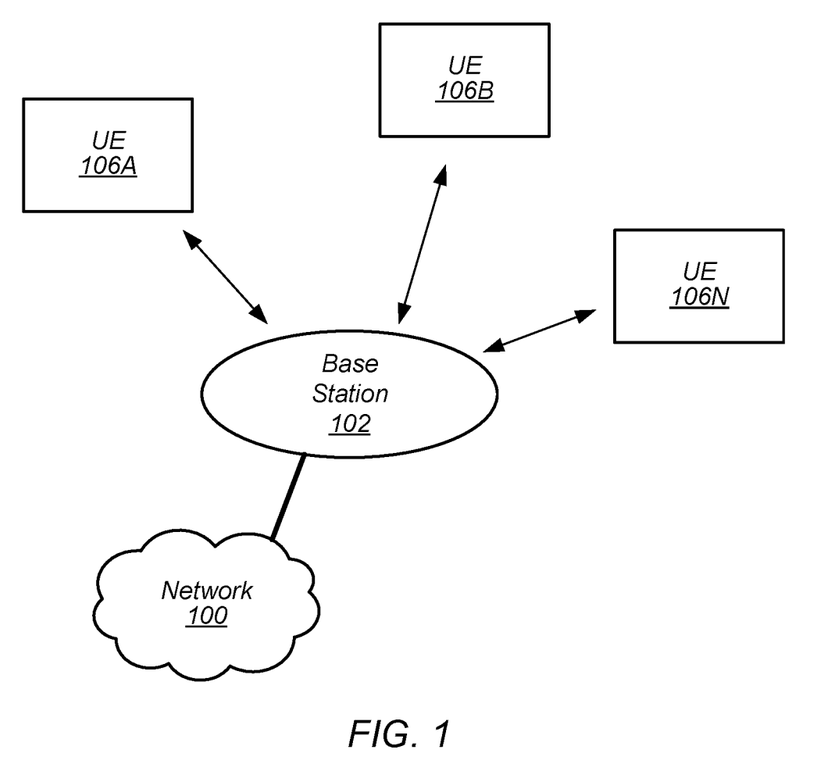
FIG. 1 illustrates an exemplary (and simplified) wireless communication system, according to some embodiments.
Figure 2:
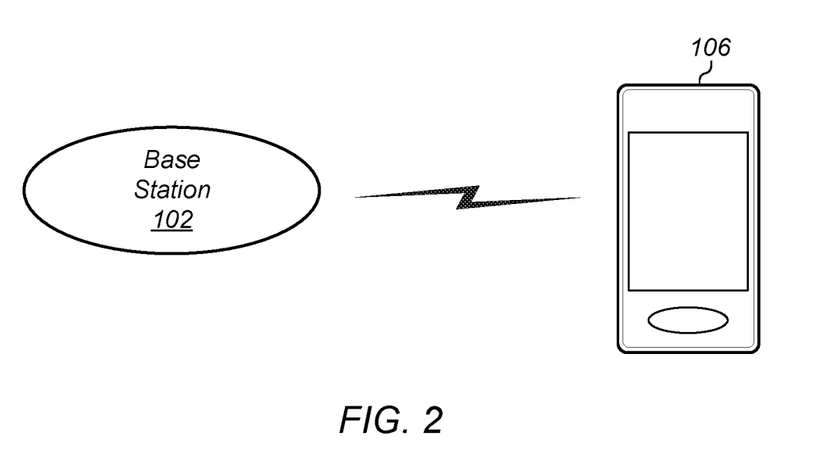
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106 are referred to as UEs or UE devices.

Various ones of the UE devices may perform adaptive procedures for measurement of wireless channel conditions, e.g. during New Radio (NR) and/or LTE communications, according to various embodiments disclosed herein.

The base station 102 may be a base transceiver station (BTS) or cell site, and may include hardware that enables wireless communication with the UEs 106A through 106N. The base station 102 may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may be considered at least a part of the UE communicating on the network or over the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. In some embodiments, the base station 102 may communicate with UEs performing adaptive procedures for measurement of wireless channel conditions, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum. Overall, the use of various terms and expressions will always be clearly indicated with respect to and within the context of the various applications/embodiments under consideration.

As mentioned above, UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
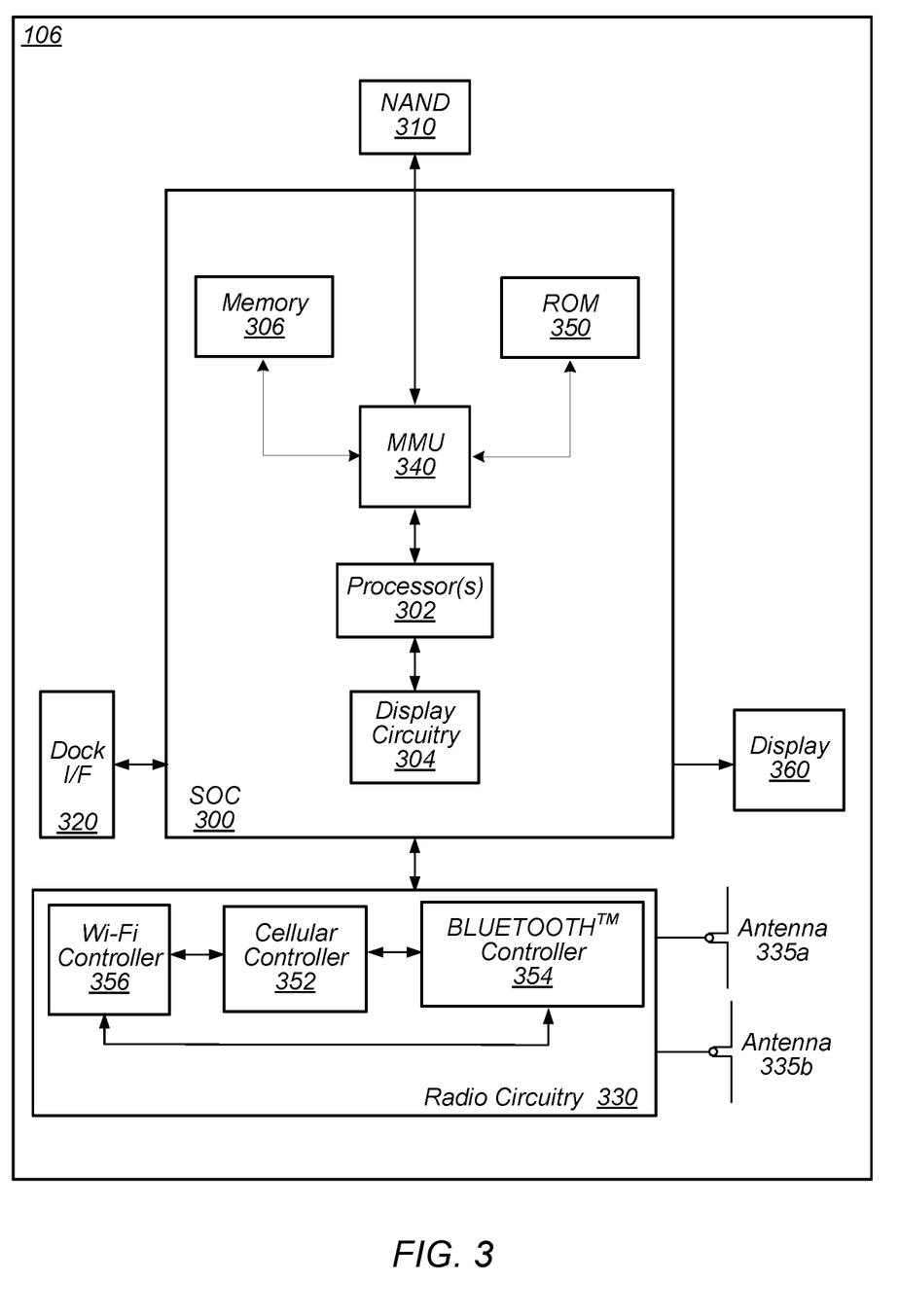
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to perform adaptive procedures for measurement of wireless channel conditions, e.g. when operating on an LTE or NR network, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform adaptive procedures for measurement of wireless channel conditions, according to various embodiments disclosed herein. Processor(s) 302 may also implement various other applications and/or end-user applications running on UE 106.

Figure 5:
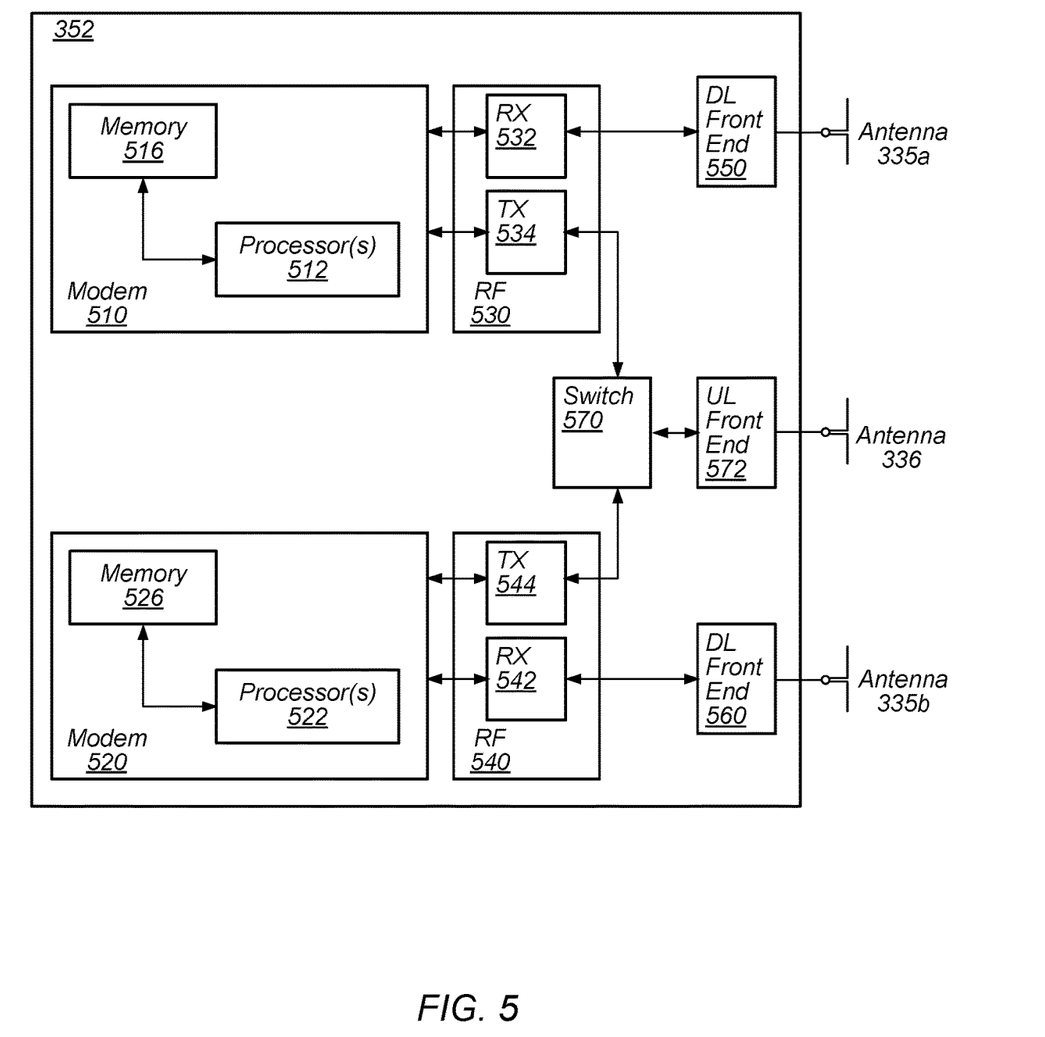
FIG. 5 shows an exemplary simplified block diagram illustrative of cellular communication circuitry, according to some embodiments.

In some embodiments, radio 300 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
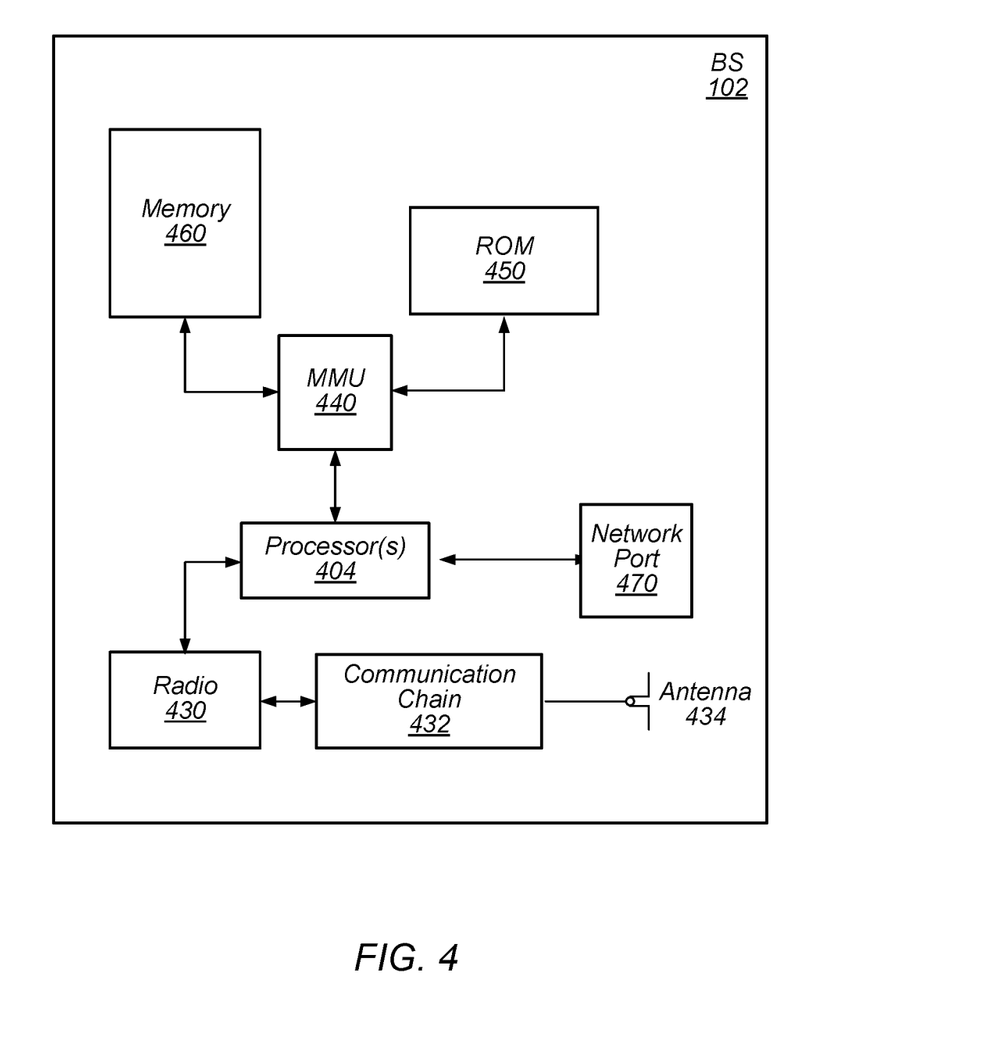
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that may perform adaptive procedures for measurement of wireless channel conditions, e.g. during New Radio (NR) and/or LTE communications. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for communicating with UE devices that perform adaptive procedures for measurement of wireless channel conditions as disclosed herein.

FIG. 5—Block Diagram of Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly with the UL front end 572.

Adaptive Procedures for Measurement of Wireless Channel Conditions

As previously mentioned, a mobile device (e.g. UE) communicating on a given cell may perform measurements of wireless channel conditions, e.g. signal strength/quality, including the signal strength/quality of neighbor cells, for a variety of reasons, at least partially to improve the overall operation of the UE. The measurement results may trigger one or more different types of events, for example a handover or redirection/reselection of the UE to a different cell. However, when a UE is executing/running certain applications and/or making measurements before security on a device is enabled by the network, the performance of the UE may be adversely affected when performing measurements and transmitting measurement reports according to statically established settings.

Pursuant to the above, in various embodiments, the measurement behavior of a UE (or device, or wireless communication device) when running certain application(s), e.g. Siri, may be designed to be adaptive and thus increase and enhance performance of the application(s) and consequently the performance of the UE. The measurement behavior of the UE may be similarly improved for cases when the UE performs measurements prior to security (which may include ciphering and integrity protection) having been enabled by on the UE, e.g. by the network.

Figure 6:
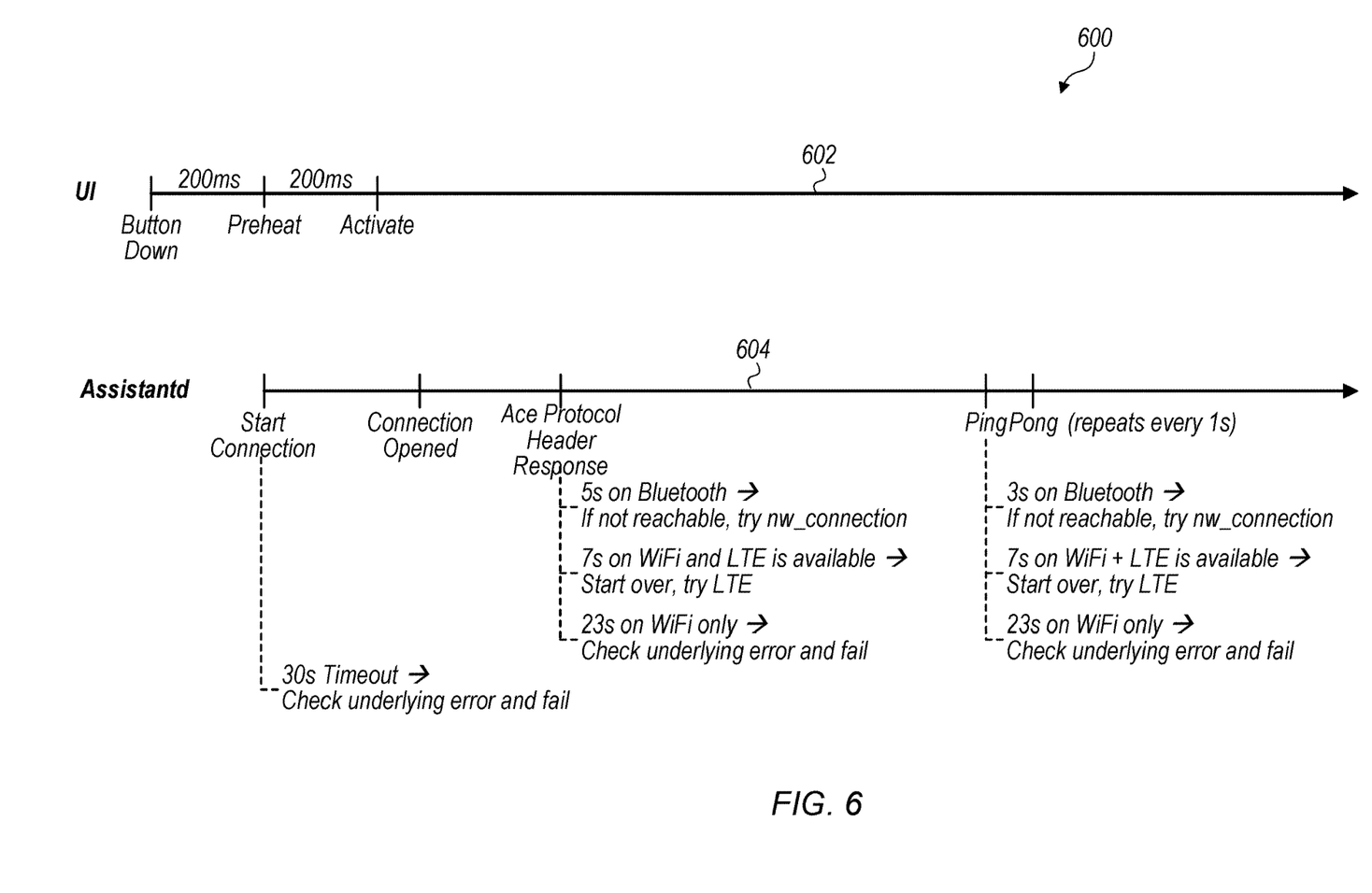
FIG. 6 shows an exemplary diagram illustrating the timeline corresponding to the execution of an exemplary application on a wireless communication device.

FIG. 6 shows an exemplary diagram 600 illustrating the timeline corresponding to the execution of an exemplary application, in this case "Siri", on a wireless communication device. The timeline in FIG. 6 is merely to illustrate the issues that may arise when executing certain applications on a device, for example applications requiring interactive user input, and how execution of the application, and consequently the performance of the application and the UE may be affected by measurements of wireless channel conditions performed by the UE. As shown in FIG. 6, a User Interface (UI) timeline 602 illustrates timing of various stages associated with execution of the (exemplary) application with respect to a user interaction, in this case a user query. From the moment in time that interaction is initiated, illustrated by the "Button Down" event on timeline 602, a specified time period, in this case 400 ms elapses before the application detects that user interaction is desired. At the activate point the application is ready for user interaction.

In this case, the UE is assumed to be operating on a cellular network. Accordingly, the connection is assumed to be started on a cellular link as indicated by the Start Connection on timeline 604 of a daemon, in this case named Assistantd, executing/running on the UE. It should be noted that in multitasking computer operating systems, a daemon is a computer program that runs as a background process, rather than being under the direct control of an interactive user. In the example of FIG. 6, Assistantd represents a background process associated with the application which is under interactive user control as shown in UI timeline 602. Assistantd may include a protocol, in this instance named Ace Protocol, established between the UE (or device) and a server with which the UE is communicating as part of executing the application. The timeline 604 illustrates how connection between the server and the UE may be established via one of many different possible wireless connections, assuming a connection started over cellular network, as indicated above.

With respect to the timelines 602 and 604 shown in FIG. 6, activity for the type of application(s) under consideration (e.g. Siri), when executing on the UE communicating over cellular connection typically occurs in small bursts of data. In other words, the application does not require a high throughput, clean channel link, but instead relies on low latency. When the UE starts reporting measurements (corresponding to wireless channel/link conditions), the network, depending on the amount of traffic and data throughput, may either redirect the UE to another cell (e.g. LTE cell or NR cell) or may handover the UE to another cell. When redirecting to another cell, the UE may move from a connected state on the current cell to an idle state on the new cell to which the UE is redirected. When handed over to a new cell, the UE may move from a connected state on the current cell to a connected state on the new cell to which the UE is handed over.

Figure 9:
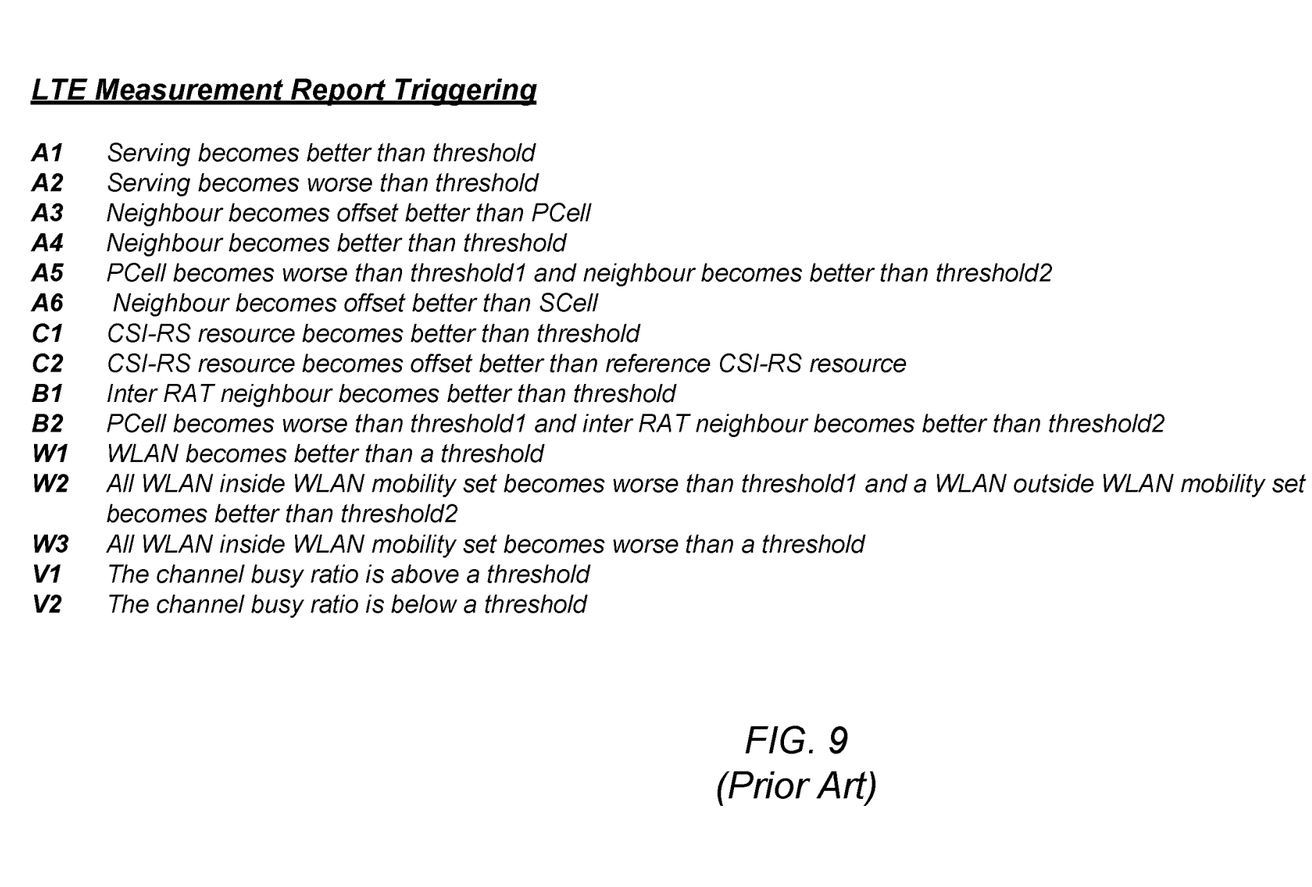
FIG. 9 shows a table illustrating a list of LTE measurement report triggering events, according to prior art.

The network may configure various different measurement events that may trigger the UE transmitting a measurement report to the network, which may result in the UE being redirected or handed over to a new cell. For example, considering LTE, FIG. 9 shows a table illustrating a list of measurement report triggering events, according to prior art. Referring to FIG. 9, the network typically configures an A2 measurement event to ensure that the device moves away from a degrading serving cell, and moves to a better cell. When device reports A2 measurements, the network may redirect the UE to another, stronger cell. Typically, when an A2 measurement results in a certain value (see FIG. 9; when the measurement of the serving cell falls below a certain threshold value), the UE reports the measurement result to the serving cell. Similarly, when the device reports A4 measurements, a handover of the UE to a new cell may be triggered. For example, if there is a lot of data activity, an A4 measurement might also trigger a report to the NW, and if the A4 criteria are met, e.g. serving cell falling below a certain threshold and neighbor cell measurement being better, based on the data throughput, the network may perform (initiate and conduct) an handover operation. When the data throughput is sparse/low, the network might redirect the UE to the new cell. The benefit of such redirection/handover may be that the device may thereby be camped/connected on a more favorable cell with respect to wireless channel/link conditions. However, in the process of moving to this more favorable cell, the device (UE) may use up critical time in establishing an RRC connection on the new cell. In some cases it may take all the way up to 500 ms for a UE to establish such a connection.

A2-based measurements getting triggered cause the network to try to redirect the UE to another frequency which triggers re-acquisition of SI (system information) and service acquisition procedure in order to start the TCP (Transmission Control Protocol) communication for the application-based request (i.e. a request originating from the application). The latencies experienced by the application may be further impacted if the network is loaded, leading to an increase in latencies at mid-cell conditions, and application session failures at far-cell conditions. A major portion of the latencies experienced by the application may be due to a load balancing feature enabled on the network, which may trigger redirection to another frequency after the UE transmits an A2 report. Therefore, the UE may have to acquire the new cell and establish the new RRC and NAS (non-access stratum) connection, thereby establishing a data bearer to complete the application request. It should be noted that the NAS is a functional layer in the wireless telecom protocol stacks (e.g. UMTS and LTE wireless telecom stacks) between the core network and user equipment, and is used to manage the establishment of communication sessions and for maintaining continuous communications with the user equipment as it moves. The NAS is defined in contrast to the Access Stratum (AS) which is responsible for carrying information over the wireless portion of the network. A NAS is also a protocol for messages passed between the UE and core network nodes (e.g. Mobile Switching Center, Serving GPRS Support Node, or Mobility Management Entity) that is passed transparently through the radio network. Commercial networks are expected to enable load balancing, and while the load-balancing feature built-in by network service providers has its advantages, it does have a drawback with respect to the UE being redirected and/or handed over to a new cell, causing the application (e.g. Siri) to experience higher than desired latencies.

Thus, when data throughput is not very high, there may be no need for the UE to be handed over, and redirection of the UE to a new cell, i.e. residing in an idle state on new cell, may be sufficient. However, critical time may still be wasted in establishing an RRC connection on the new cell, even if the new RRC connected state is an idle state. Since the goal is to make the application-based request (e.g. a Siri request) successful, it may be advantageous for the UE to remain on a current serving cell as long as possible without compromising the overall operation of the UE.

Figure 7:
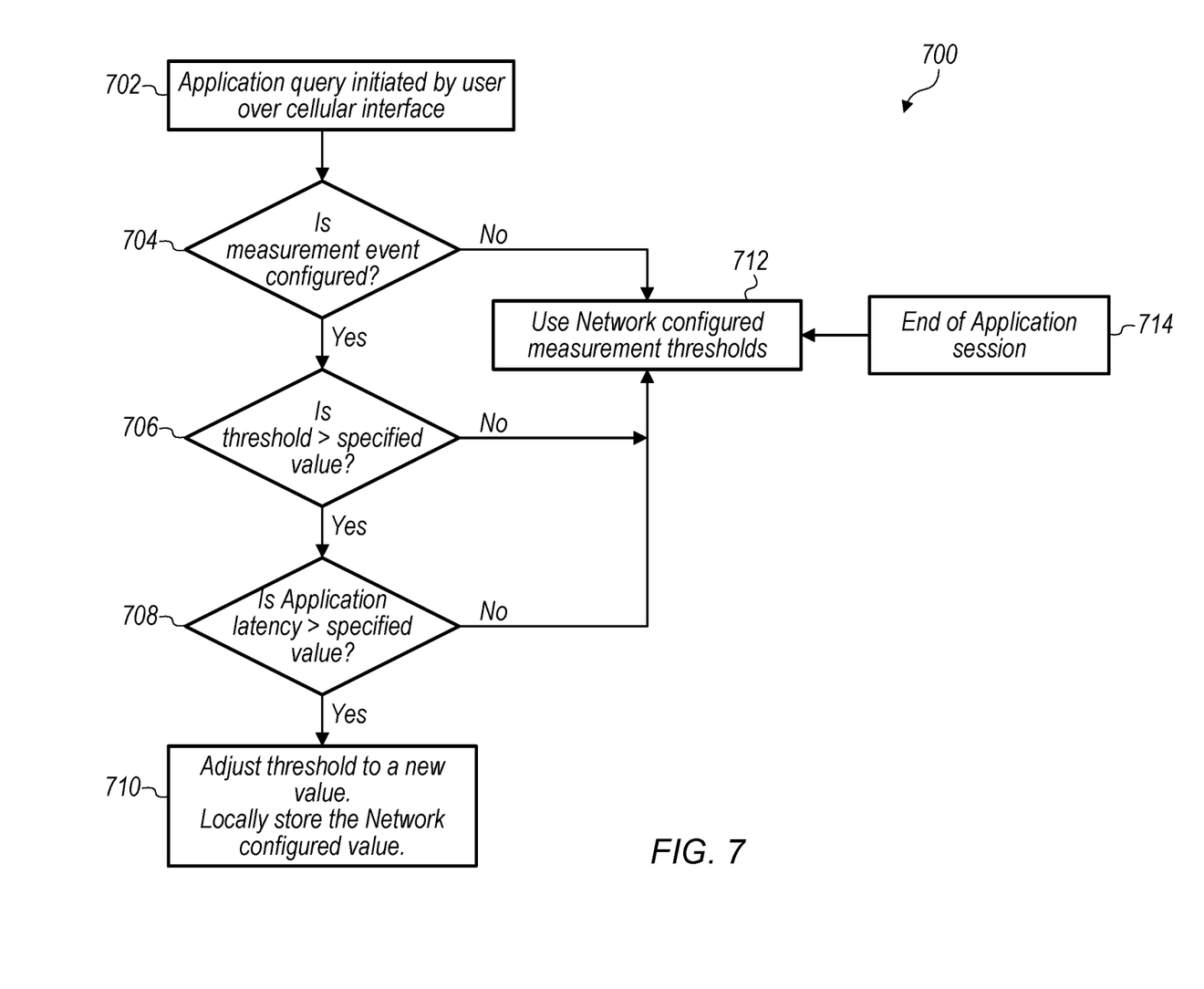
FIG. 7 shows a flow diagram illustrating an adaptive procedure for performing measurement of wireless channel conditions when the measurement event has been configured prior to an active session of an application executing on the wireless communication device, according to some embodiments.

Adaptive Procedure for Measurement of Wireless Channel Conditions when a Measurement Event is Configured Before an Application Session is Active Pursuant to the above, an adaptive procedure may be configured for the UE to measure wireless channel/link conditions, which may improve operation of certain applications, such as Siri, for example, executing on the UE. FIG. 7 shows a flow diagram illustrating an adaptive procedure for performing measurement of wireless channel conditions when the measurement event is configured prior to an active session of an application executing on the wireless communication device, according to some embodiments. At 702, an application query may be initiated, for example by a user, over a cellular interface. The application may be running on a UE operating on a cellular networked served by a current serving cell. If a measurement event, e.g. an A2 measurement event (in reference to FIG. 9) has not been configured ("No" branch at 704), then the UE may continue to use the network-configured measurement thresholds when making measurements and triggering measurement reports or reporting to the network (712). If the measurement event has been configured ("Yes" branch at 704), and the present value of a threshold associated with the measurement event (e.g. an A2 threshold in reference to FIG. 9) is not greater than a specified value ("No" branch at 706), the UE may continue using the network-configured measurement thresholds when making measurements and triggering measurement reports or reporting to the network (712).

In one sense, the present threshold value is evaluated/checked against the specified value to avoid reporting certain measurement(s). For example, during configuration of the measurement event, the threshold may have been set to a present value corresponding to channel/link conditions at which the given application may not experience any considerable performance issues. However, measurements returning that value would trigger a measurement report, which may lead to some of the issues described above with respect to the performance of certain applications suffering due to the UE moving to a new cell/network when a cell/network change might not be necessary and/or essential. Thus, by adaptively adjusting the threshold, as will be further detailed below, the performance of the application may not suffer while still maintaining efficient overall operation of the UE.

If the present value of the threshold associated with the measurement event is greater than the specified value ("Yes" branch at 706), and the application latency, i.e. a latency experienced by the application executing on the UE (e.g. Siri latency when executing Siri on the UE), is not greater than a specified latency value ("No" branch at 708), the UE may continue using the network-configured measurement thresholds when making measurements and triggering measurement reports or reporting to the network (712). As shown in algorithm 700, the application latency evaluation at 708 is an example of the more general concept of evaluating/checking a performance characteristic of the application. Thus, more generally, 708 may represent checking whether the performance characteristic of the application meets a certain metric (e.g. a specified metric), and branching from 708 accordingly. In the case illustrated in algorithm 700, if the latency experienced by the application executing on the UE is greater than the specified latency value, for example greater than 4 seconds, ("Yes" branch at 708), the threshold value associated with the measurement event may be adjusted to a new value, and the network-configured value for the threshold (i.e. the present value of the threshold at 706) may be stored locally (710). In some embodiments, the flow diagram 700 may be continuous over the time period of a given session of the application executing on the UE. In some embodiments, the flow diagram 700 may be a part of a protocol (e.g. as part of a daemon running on the UE and associated with the executing/running application) established between the UE and a server, e.g. the "Ace" protocol mentioned in FIG. 6.

The value of the threshold associated with the measurement event may be configured for the given network, meaning that the measurements need to meet that threshold in order for the UE to remain on the given network. For example, the threshold evaluated at 706 may represent a specific A2 measurement threshold (in reference to FIG. 9, for example) configured as part of the measurement configurations when the UE is in a connected state. At 710, the threshold may be dynamically reconfigured in the protocol stack. In some embodiments, the new value for the threshold may be determined/assigned by adding a specific value to a base value established for the given network/cell as part of the system information. Specifically, the base value may correspond to a minimum signal strength required for the UE to camp on the given network/cell. For example, in some embodiments, the specified value at 706 may be −110 dB, and the minimum value at 710 may be −122 dB, with the new value set to −122 dB+3 dB=−119 dB. However, in alternate embodiments, adjustment of the threshold may differ from the above and may be determined based on a variety of factors, for example based on specific application requirements and/or other operating characteristics of the UE possibly related to or associated with specific application(s) executing on the UE.

Once the threshold value has been adjusted at 710, it may stay that value for the given session of the application, and the UE may return to using the network-configured measurement thresholds (712) upon the end of the application session (714). That is, the enhancement illustrated in flow diagram 700 may be performed on a per-application session basis. The interior loop (704, 706, 708, and 712) may be ongoing, with the crucial checkpoint at 708. Once the value of the threshold has been adjusted to a new value, the new value may remain the same for the rest of the application session. In some embodiments, the algorithm 700 may also execute on a per-RRC connection basis. For example, if a next (new) application session is started within the same RRC connection (e.g. before the network has released the current RRC connection), then any previously set new value, obtained from adjusting the threshold value to the new value at 710, may be used. If the new application session is started for a new RRC connection, then the UE may again begin using the threshold configured by the network (712) when entering the inner loop of the algorithm 700.

Figure 8:
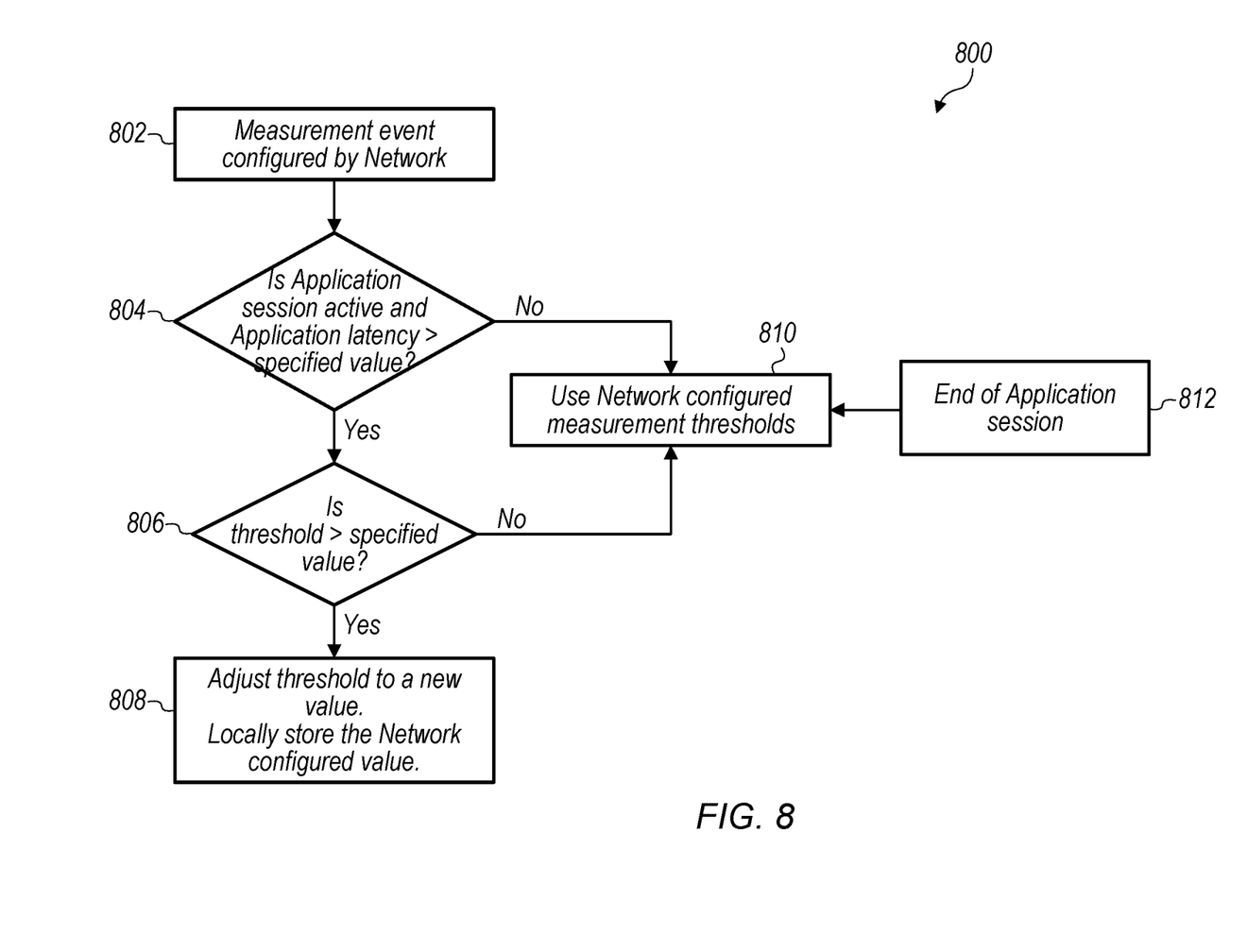
FIG. 8 shows a flow diagram illustrating an adaptive procedure for performing measurement of wireless channel conditions when the measurement event is configured during an active session of an application executing on the wireless communication device, according to some embodiments.

Adaptive Procedure for Measurement of Wireless Channel Conditions when a Measurement Event is Configured During an Active Application Session Similar to the procedure outlined in FIG. 7, an adaptive procedure may be configured for the UE to measure wireless channel/link conditions in a way that improves operation of certain applications executing on the UE when the measurement event is configured during an active session of an application executing on the UE, as illustrated in FIG. 8. The application may be running on a UE operating on a cellular networked served by a presently serving cell. At 802, a measurement event, e.g. an A2 measurement event (in reference to FIG. 9) may be configured by the network. If an application session of a given application executing on the UE is active and the application latency is greater than a specified latency value, e.g. greater than 4 sec ("Yes" branch at 804), and the present value of a threshold associated with the measurement event (e.g. an A2 threshold in reference to FIG. 9) is greater than a specified value ("Yes" branch at 806), then the value of the threshold associated with the measurement event may be adjusted to a new value, and the network-configured value (i.e. the present value at 806) for the threshold may be stored locally (808). Otherwise, ("No" branch taken at 804 or "No" branch taken at 806), the UE may continue using the network-configured measurement thresholds when making measurements and triggering measurement reports/reporting to the network (810). It should be noted that the value to which the latency is compared at 804 (and also at 708 in FIG. 7) may differ depending on the application and/or other considerations and may vary across various different embodiments. Furthermore, similar to what is shown in algorithm 700, the application latency evaluation at 804 is merely an example of the more general concept of evaluating/checking a performance characteristic of the application. Thus, more generally, the application latency evaluation at 804 illustrates the more general concept of evaluating/checking whether the performance characteristic of the application meets a certain metric (e.g. a specified metric), and branching from 804 accordingly.

In some embodiments, the flow diagram 800 may be continuous over the time period of a given session of the application executing on the UE. In some embodiments, the flow diagram 800 may be a part of a protocol (e.g. as part of a daemon running on the UE and associated with the executing/running application) established between the UE and a server, e.g. the "Ace" protocol mentioned in FIG. 6. As was the case with algorithm 700 in FIG. 7, the value of the threshold associated with the measurement event may be configured for the given network, meaning that the measurements need to meet that threshold in order for the UE to remain on the given network. At 808, the threshold may be dynamically reconfigured in the protocol stack. Similar to algorithm 700, the new value for the threshold may be determined/assigned by adding a specific value to a base value established for the given network as part of the system information, where, in some embodiments, the base value may correspond to a minimum signal strength required for the UE to camp on the given network/cell. For example, the specified value at 806 may be −110 dB, and the minimum value at 808 may be −122 dB, with the new value set to −122 dB+3 dB=−119 dB. As was the case with algorithm 700, in alternate embodiments exemplified by algorithm 800, adjustment of the threshold may differ from the above and may be determined based on specific application requirements and/or other operating characteristics of the UE possibly related to or associated with specific application(s) executing on the UE. Once the threshold value has been adjusted at 808, it may remain the same value for the given session of the application, and the UE may return to using the network-configured measurement thresholds (810) upon the end of the application session (812). That is, the enhancement illustrated in flow diagram 800 may be performed for the active session for the application. The interior loop (804, 806, and 810) may be ongoing, with the crucial checkpoint at 806. Once the threshold has been adjusted to a new value at 808, the new value may remain the same for the rest of the application session. In some embodiments, the algorithm 800 may also execute on a per-RRC connection basis in a manner similar to algorithm 700.

Adaptive Procedure for Measurement of Wireless Channel Conditions Before Security is Enabled on the Device In some cellular network standards, e.g. according to LTE/5G-NR RAN2 specifications, the network may configure the UE to begin performing connected-mode measurements even before access stratum (AS) security has been established. This enables the UE to complete the connected-mode measurement reports and immediately begin transmitting the measurement reports to the network as soon as security has been established on the UE (e.g. by the network). That is, while UE is allowed to make measurements prior to security being established, it may transmit measurement reports to the network only after security has been established. However, there are deployments where due to high network loads the network may take a longer than usual (or expected) time to enable AS security after configuring the measurements or measurement events. For example, in some cases the network may take almost 1-2 seconds to enable AS security after having configured the measurement or measurement events. In connected-mode, the UE may perform measurements every C-DRX cycle, which may lead to redundant measurement samples within a certain time period, e.g. within a 2-second window. As a consequence, the UE may waste RF resources as well as power (draining the battery powering the UE, for example) to conduct measurements that become redundant in connected-mode for the same set of serving and neighbor cells.

In order to alleviate and/or minimize the problem described above, an adaptive procedure for performing measurement may be implemented when measurements have been configured before AS security has been established. In some embodiments, the serving-cell measurements over all neighbor-measurements may be prioritized. That is, the measurements performed on the serving cell may be given higher priority than measurements performed on neighboring cells. Furthermore, intra-frequency neighbor measurements may be prioritized over inter-frequency neighbor measurements. For example, same frequency neighbors may be measured before different frequency neighbors. Relaxed measurements may be introduced to leverage a tradeoff between performance and power savings. For example, instead of performing a measurement on the serving cell every C-DRX On-duration, the serving cell may be measured once every five (5) C-DRX On-duration. Similarly, instead of performing a measurement on neighboring cells on every C-DRX On-duration, the neighboring cells may be measured once every ten (10) C-DRX On-duration. In general, measurements may be performed on fewer occasions in order to achieve power savings.

In some embodiments, if a device is static, that is, the device is not moving, and a valid bad measurement sample has been obtained for a particular neighboring cell (a measurement sample of lower value than a specified threshold value, e.g. −110 RSRP dBm), measurement of this neighbor cell may be deprioritized until valid measurements have been performed for all other neighbor cells. Since that particular neighbor cell has been determined to be experiencing very poor channel/link conditions, continued measurements of that particular neighbor cell become unnecessary. The adaptive techniques for performing measurements before security is enabled may be combined with the adaptive techniques described above to reduce the latency experienced by certain applications executing on the UE, thereby further improving overall operation of the UE.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processing element configured to cause a device to:
wirelessly communicate over a wireless network;
adjust a threshold from a network-configured value to a new value different from the network-configured value in response to a performance characteristic of an application executing on the device not meeting a specified metric, wherein the threshold is associated with a measurement report triggering event configured by the wireless network for the device to perform corresponding measurements on wireless channel conditions of the wireless network; and
use the new value for the threshold when performing the corresponding measurements.

2. The apparatus of claim 1, wherein the performance characteristic of the application executing on the device not meeting the specified metric comprises the application experiencing a latency greater than a specified latency value.

3. The apparatus of claim 1, wherein the processing element is configured to further cause the device to locally store the network-configured value.

4. The apparatus of claim 1, wherein the processing element is configured to further cause the device to adjust the threshold once per one of:
 an application session of the application; or
 a current radio resource control (RRC) connection before the wireless network releases the current RRC connection.

5. The apparatus of claim 1, wherein the processing element is configured to further cause the device to adjust the threshold only if the network-configured value is greater than a specified threshold value.

6. The apparatus of claim 1, wherein the processing element is configured to further cause the device to begin using the network-configured value for the threshold upon conclusion of a present session of the application.

7. The apparatus of claim 1, wherein the processing element is configured to further cause the device to perform one or more of the following, if one or more measurement report triggering events for the device have been configured before security for the device has been established:
 prioritize serving cell measurements of the measurements on the wireless channel conditions of the wireless network over neighbor cell measurements of the measurements on the wireless channel conditions of the wireless network;
 prioritize intra-frequency neighbor measurements of the neighbor cell measurements over inter-frequency measurements of the neighbor cell measurements;
 perform a single serving-cell measurement of over multiple connected mode discontinuous reception on-durations; or
 perform a single neighbor-cell measurement over multiple connected mode discontinuous reception on-durations.

8. A device comprising:
 radio circuitry configured to facilitate wireless communications of the device over a wireless network; and
 a processing element communicatively coupled to the radio circuitry and configured to cause the device to:
 adjust a threshold from a network-configured value to a new value different from the network-configured value in response to a performance characteristic of an application executing on the device not meeting a specified metric, wherein the threshold is associated with a measurement report triggering event configured by the wireless network for the device to perform corresponding measurements on wireless channel conditions of the wireless network; and
 use the new value for the threshold when performing the corresponding measurements.

9. The device of claim 8, wherein the performance characteristic of the application executing on the device not meeting the specified metric comprises the application experiencing a latency greater than a specified latency value.

10. The device of claim 8, wherein the processing element is configured to further cause the device to locally store the network-configured value.

11. The device of claim 8, wherein the processing element is configured to further cause the device to adjust the threshold once per one of:
 an application session of the application; or
 a current radio resource control (RRC) connection before the wireless network releases the current RRC connection.

12. The device of claim 8, wherein the processing element is configured to further cause the device to adjust the threshold only if the network-configured value is greater than a specified threshold value.

13. The device of claim 8, wherein the processing element is configured to further cause the device to begin using the network-configured value for the threshold upon conclusion of a present session of the application.

14. The device of claim 8, wherein the processing element is configured to further cause the device to perform one or more of the following, if one or more measurement report triggering events for the device have been configured before security for the device has been established:
 prioritize serving cell measurements of the measurements on the wireless channel conditions of the wireless network over neighbor cell measurements of the measurements on the wireless channel conditions of the wireless network;
 prioritize intra-frequency neighbor measurements of the neighbor cell measurements over inter-frequency measurements of the neighbor cell measurements;
 perform a single serving-cell measurement of over multiple connected mode discontinuous reception on-durations; or
 perform a single neighbor-cell measurement over multiple connected mode discontinuous reception on-durations.

15. A non-transitory memory element storing instructions executable by a processing element to cause a device to:
 wirelessly communicate over a wireless network;
 adjust a threshold from a network-configured value to a new value different from the network-configured value in response to a performance characteristic of an application executing on the device not meeting a specified metric, wherein the threshold is associated with a measurement report triggering event configured by the wireless network for the device to perform corresponding measurements on wireless channel conditions of the wireless network; and
 use the new value for the threshold when performing the corresponding measurements.

16. The non-transitory memory element of claim 15, wherein the performance characteristic of the application executing on the device not meeting the specified metric comprises the application experiencing a latency greater than a specified latency value.

17. The non-transitory memory element of claim 15, wherein the instructions are executable by the processing element to further cause the device to locally store the network-configured value.

18. The non-transitory memory element of claim 15, wherein the instructions are executable by the processing element to further cause the device to adjust the threshold once per one of the following:
 an application session of the application; or
 a current radio resource control (RRC) connection before the wireless network releases the current RRC connection.

19. The non-transitory memory element of claim 15, wherein the instructions are executable by the processing element to further cause the device to adjust the threshold only if the network-configured value is greater than a specified threshold value.

20. The non-transitory memory element of claim 15, wherein the instructions are executable by the processing element to further cause the device to begin using the network-configured value for the threshold upon conclusion of a present session of the application.

* * * * *